United States Patent [19]

Wang

[11] Patent Number: 5,219,177
[45] Date of Patent: Jun. 15, 1993

[54] RELEASABLE LATCH FOR AIR BAG DEPLOYMENT DOOR

[75] Inventor: Jenne-Tai Wang, Troy, Mich.

[73] Assignee: General Motors Corporation, Detroit, Mich.

[21] Appl. No.: 901,477

[22] Filed: Jun. 19, 1992

[51] Int. Cl.⁵ .............................................. B60R 21/20
[52] U.S. Cl. .................... 280/728; 280/732; 292/171
[58] Field of Search ............... 280/732, 731, 728, 743; 292/167, 171

[56] References Cited

U.S. PATENT DOCUMENTS

| | | | |
|---|---|---|---|
| 4,773,673 | 9/1988 | Sakurai | 280/732 |
| 5,035,444 | 7/1991 | Carter | 280/728 |
| 5,046,758 | 9/1991 | Rafferty et al. | 280/732 |

FOREIGN PATENT DOCUMENTS 2425659 11/1975 Fed. Rep. of Germany.

Primary Examiner—Eric D. Culbreth
Attorney, Agent, or Firm—Charles E. Leahy

[57] ABSTRACT

An air bag deployment door in an instrument panel has a sliding bolt engaging an aperture in the panel to latch the door closed. A pivoted linkage connected to the bolt is engaged by the air bag upon initial inflation to withdraw the bolt to release the door. Alternatively, a flexible plastic sheet covering a recess in the inner side of the door has a movable margin portion which engages a slot in the instrument panel opening to latch the door closed. The air bag, upon initial inflation, pushes the sheet into the recess causing the margin portion to pull out of the slot to release the door.

7 Claims, 2 Drawing Sheets

RELEASABLE LATCH FOR AIR BAG DEPLOYMENT DOOR

FIELD OF THE INVENTION

This invention relates to a deployment door for a vehicle air bag and more particularly to a latch for holding the door closed until initial displacement of the air bag.

BACKGROUND OF THE INVENTION

It is well known in motor vehicles to mount an air bag beneath the instrument panel for deployment through an opening in the instrument panel. The opening in the instrument panel is conventionally closed by a deployment door which is hingedly mounted on the instrument panel by a hinge defining a transversely extending hinge axis. It is also known in the prior art that the hinge may be defined by a flexible or elastic strap allowing door opening to facilitate the deployment of the air bag through the opening.

Prior to opening, the door must be held in place securely enough to prevent tampering. On the other hand, when the air bag is deployed, the resistance force holding the door closed should be as small as possible. It is known to use either skin lock or locking bolts to secure the door. In these designs, the skin lock or the locking bolts will be broken by the pressure built up in the bag and the deployment door will then be free to hinge open and deploy the bag.

It is also known to use a latch to hold the door closed and a gas pressure operated cylinder and piston device to release the latch when the bag is deployed, using the gas pressure fed through a special passage from the air bag inflater to operate the release mechanism. While the concept of using a latch for the deployment door is a desirable feature, the separate system for releasing the latch adds complexity to the air bag system.

SUMMARY OF THE INVENTION

It is therefore an object of the invention to provide a simple arrangement for latching an air bag deployment door closed and for releasing the latch upon initial inflation of the air bag.

The invention is carried out by a door fitting in an opening in a vehicle and latched at least on one side by a simple slide mechanism which engages the edge of the opening, and a release mechanism which responds to the movement of the air bag itself for withdrawing the slide, thereby obviating the need for high air bag pressures to open the door and for separate pressure operated actuators for latch release.

Two latch embodiments are disclosed. One uses a spring biased bolt slidably mounted on the door and engaging a notch in the edge of the instrument panel opening. A pivoted linkage attached at its ends to the door and the bolt has an articulated center extending toward the air bag, and upon initial displacement of the air bag the front of the bag pushes on the linkage to slide the bolt to its release position. The other embodiment has a plastic or other flexible sheet attached to the door and carrying a slide on one side for engaging a detent in the panel opening to latch the door. When the bag initially inflates it pushes on the sheet causing the margin and the slide to pull away from the detent to release the door.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
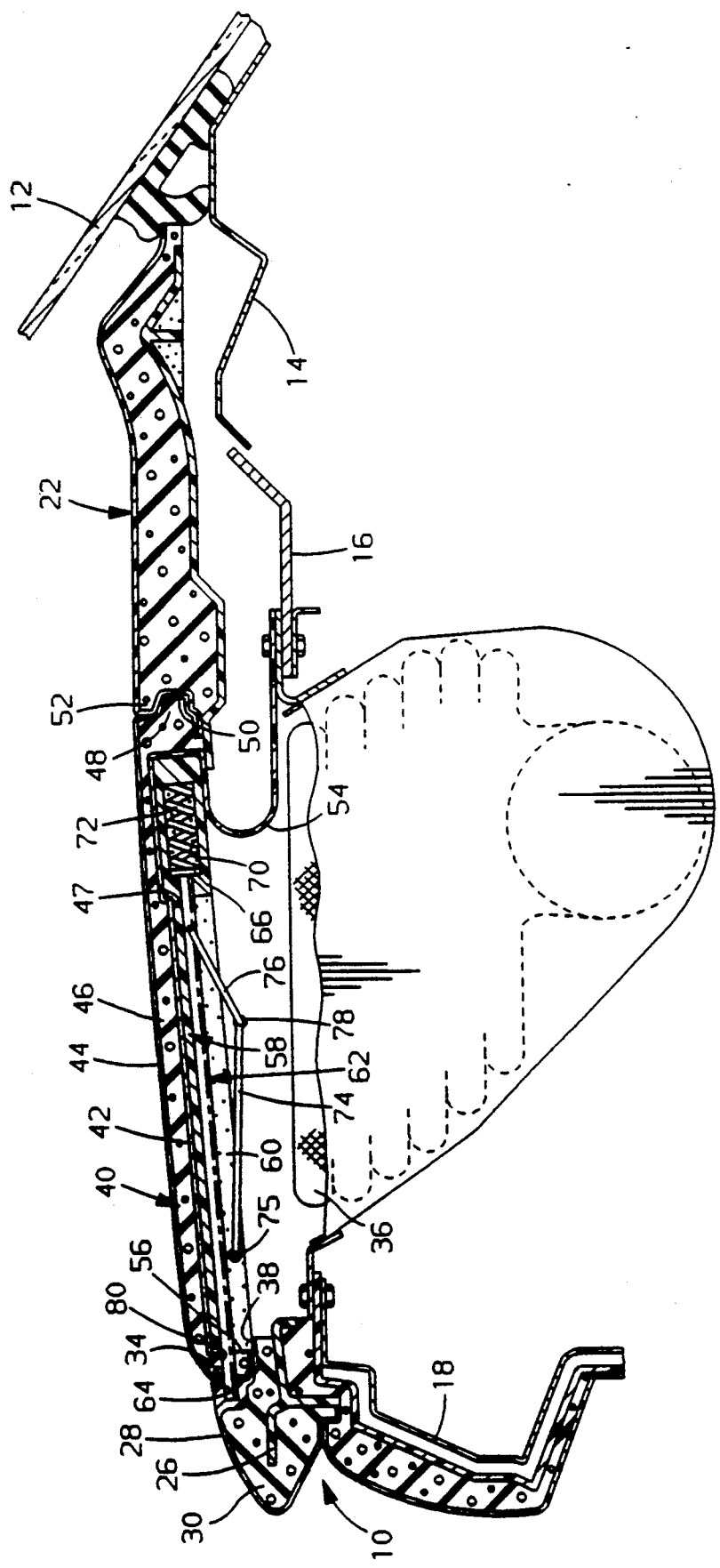
FIG. 1 is a cross section of an air bag module and an instrument panel with a deployment door latched according to one embodiment of the invention.

Referring to FIG. 1, it is seen that a vehicle body includes an instrument panel 10 and a windshield 12. The instrument panel structure of the vehicle is supported by sheet metal stampings 14, 16 and 18 which are suitably welded and bolted together to provide a rigid understructure. The panel 10 also has an instrument panel cover 22 which includes a molded plastic base panel 26, a layer of decorative trim 28, and a cushion of foam 30 which is molded in place between the base panel 26 and the decorative trim 28. The instrument panel 10 has a rectangular opening 34 therein through which an inflatable air bag 36 is deployed to restrain the vehicle occupant. The opening 34 has a shelf 38 extending around its periphery.

An air bag deployment door 40 is hingedly mounted to close the air bag opening 34. The deployment door 40 is comprised of a stamped sheet metal substrate panel 42 and a decorative trim cover 44 having a layer of foam 46 molded in place therebetween. The substrate panel 42 is recessed to form a shallow depression 47 on the inner side of the door. A nose portion 48 along the front edge of the door 40 mates in a groove 50 defined between an outer lip 52 of the opening 34 and the shelf 38 to secure the door against being pushed directly outward but allows the door to pivot about its forward edge. A flexible strap hinge 54 is secured at one end to the door 40 and at the other end to the stamping 16 to thereby foster pivoting about the front edge of the door. A lip 56 along the rear edge of the door 40 seats on the shelf 38.

A door latching mechanism includes a molded insert 58 residing in the depression 47 of the door and has at least one slot 60 extending fore and aft and opening downwardly to face the air bag 36. A pin or bolt 62 is axially slidably contained in the slot 60 and extends forwardly through an aperture in the lip 56 and into an indentation or hole 64 in the edge of the instrument panel 10 adjacent the opening 34. The front end of the bolt 62 terminates in a foot portion 66 slidably mounted in a bore 70 of the insert 58. The bore 70 contains a coil spring 72 which pushes on the foot portion 66 and urges the bolt 62 rearwardly into the hole 64, thereby maintaining the door latched in closed position. A release mechanism comprises a pair of links 74 and 76 which are hinged together at a joint 78. Link 74 has its rearward end extending into the slot 60 and mounted to the insert 58 by pivot 75 and link 76 has its forward end extending into the slot and is pivoted to the bolt 62 near the foot portion 66. The joint 78 of the linkage extends toward the air bag 36.

Figure 2:
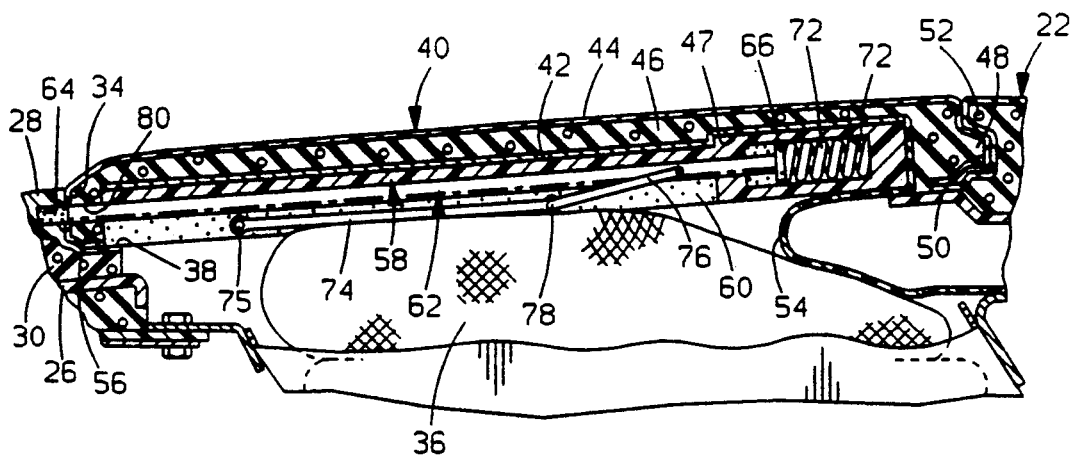
FIG. 2 is a cross section of a portion of the air bag module and deployment door of FIG. 1 showing the air bag initially inflated and the latch released.

As shown in FIG. 2, when the bag 36 initially inflates, the forward face of the bag pushes on the joint 78 of the linkage thereby tending to collapse the linkage and push the bolt 62 forward against the force of the spring 72 to withdraw the rearward end of the bolt 62 from the hole 64, releasing the latch and allowing the bag to push open the door 40 before the inflation pressure becomes large. Although FIG. 2 shows the bolt 62 fully withdrawn, the forward end of the bolt 62 has a weakening notch 80 just behind the point where it enters the hole 64, which allows the bolt 62 to break under high air bag force, thereby allowing the door to open without the bolt 62 being withdrawn from the hole 64.

Figure 3:
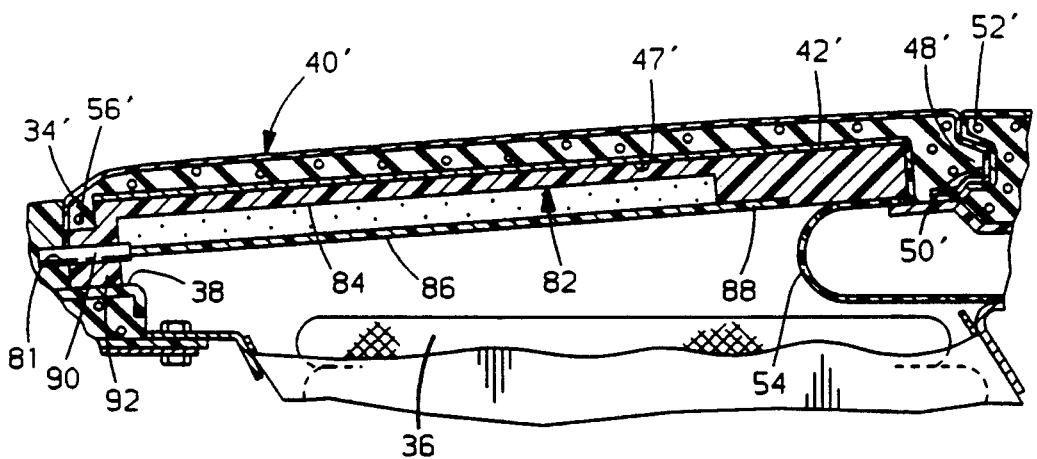
FIG. 3 is a cross section of a portion of an air bag module and a deployment door latched according to a second embodiment of the invention.
Figure 4:
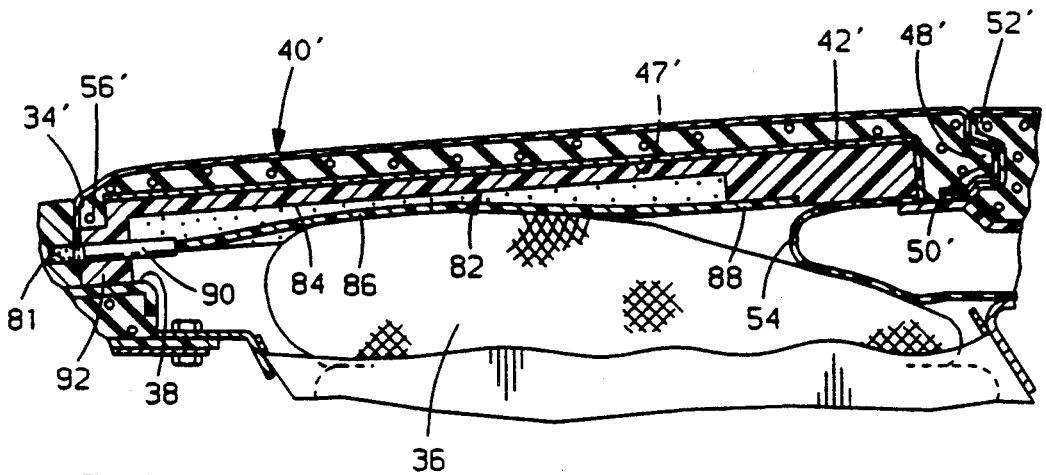
FIG. 4 is a cross section of a portion of the air bag module and deployment door of FIG. 3 showing the air bag initially inflated and the latch released.

Referring to FIGS. 3 and 4, another door latching mechanism is shown. The instrument panel 10 is the same as described above but for the hole 64 which is replaced by a wide slot 81. The door 40' is much like the door 40 except for the insert and the incorporated latching mechanism. A molded plastic insert 82 in the inner recess 47' of the door 40' contains a shallow depression or recess 84 covered at least partially by the central portion of a flexible sheet 86 of material which is fastened at its front margin 88 to the forward edge of the insert 82 near the hinge strap 54. The rear margin of the sheet 86 is integral with or attached to a slide 90 which serves as a bolt and is mounted for movement fore and aft on the rear lip 56' of the door. A slotted guide 92 depending from the lip 56' and normally resting on the shelf 38' of the instrument panel opening 34' receives and supports the slide 90 to allow sliding movement. The rearward margin of the slide 90 enters the slot 81 on the instrument panel opening to latch the door in closed position. The sheet 86 is stiff yet sufficiently resilient to provide spring bias to hold the slide 90 in the slot 81 until the air bag 36 is deployed. The sheet 86 and the slide 90 extend across, say one third, of the door width and thus are several inches wide. If desired, the slide 90 may be divided into narrower portions each engaging the slot 80. The sheet 86 may also be divided into narrower portions or straps each carrying its own slide. The sheet may be made of a polymer material such as nylon or an acrylic plastic, for example, to provide the necessary stiffness as well as flexibility. The slide 90, which may be of the same or a different material, is strong enough to hold the door 40' closed against attempts to tamper with the air bag system and yet is weak enough to break under high air bag pressure. The slide may be notched or scored along the door-opening interface to provide the necessary weakness.

As shown in FIG. 4, when the air bag 36 initially inflates, its forward face pushes the central portion of the sheet or sheets 86 into the recess 84 thereby causing the movable rearward edge of the sheet to pull back, withdrawing the slide 90 from the slot 80 to release the door. Thus deformation of the sheet 86 in the direction of air bag movement causes movement of the slide 90 in a perpendicular direction.

In each embodiment of the invention a latch is movable between latched and release positions and a latch release mechanism is exposed to the air bag so that the initial movement of the air bag upon inflation directly actuates the latch release mechanism which retracts the latch from the indented door edge to permit the door to easily swing open in a controlled manner as determined by the flexible hinge straps. Thus the door is released before a high pressure build up occurs in the air bag and the bag can emerge from the opening at a relatively low pressure.

The embodiments of the invention in which an exclusive property or privilege is claimed are defined as follows:

1. In an air bag system having an air bag opening in a vehicle and means for deploying an air bag through the opening, a latching door assembly for closing the air bag opening comprising;
   a door for covering the air bag opening;
   latch means movable between latched and released positions for releasably coupling the door to the vehicle, whereby the door is securely held against removal; and
   the latch means including bolt means mounted on the door and having a slidable portion for engaging the vehicle when in latched position and a release mechanism for contact with the air bag and responsive to initial air bag displacement for slidably withdrawing the slidable portion from the latched position to the released position, whereby the door is easily removed from the opening by the air bag.

2. The invention as defined in claim 1 wherein the latch means includes:
   a bolt slidably mounted on the door for selective engagement with the vehicle adjacent the opening;
   means on the vehicle for receiving the bolt when in engagement with the vehicle whereby the door is latched in place;
   a linkage mounted on the door and acting on the bolt when actuated for sliding the bolt to released position; and
   a portion of the linkage being exposed to the air bag for actuation when the air bag begins to inflate, whereby the door is released upon initial air bag displacement.

3. The invention as defined in claim 1 wherein the latch means includes:
   a bolt slidably mounted on the door for selective engagement with the vehicle adjacent the opening;
   spring means carried by the door and engaging the bolt for biasing the bolt toward latched position;
   a linkage mounted on the door including a first link pivoted to the door and a second link pivoted to the bolt, the two links extending from the door toward the air bag and hinged together at a common point, the linkage when actuated being effective to slide the bolt against the spring to released position; and
   the linkage being in contact with the air bag for actuation when the air bag begins to inflate, whereby the door is released upon initial air bag displacement.

4. The invention as defined in claim 1 wherein the latch means comprises a flexible sheet of material attached to the inner side of the door and carrying at one edge a marginal slide movably mounted at the edge of the door, the slide extending beyond the edge of the door for latching engagement with the vehicle adjacent the opening, and the sheet having sufficient resilience to provide spring bias of the slide toward latching position,
   the sheet having a central portion exposed to the air bag and subject to deformation whereby the slide is pulled from latching engagement upon initial air bag displacement.

5. The invention as defined in claim 1 wherein;
   the inner face of the door has a recess, and wherein;

the latch means comprises a flexible sheet mounted on the inner face of the door and spanning the recess;

one edge of the sheet carrying bolt means extending beyond the edge of the door and slidably mounted for latching engagement with the vehicle, the sheet having sufficient resilience to bias the bolt means to latching position; and the sheet having a central portion exposed on one side to the recess and on the other side to the air bag, whereby upon initial inflation the air bag pushes the sheet into the recess and thereby pulls the bolt means from latching engagement.

6. The invention as defined in claim 5 wherein the vehicle includes slot means adjacent the opening for receiving the bolt means when in latched position.

7. The invention as defined in claim 1 wherein the latch means is disposed on one edge of the door and the opposite edge of the door is hinged to the vehicle to allow a controlled opening motion of the door when the air bag is deployed.

* * * * *